United States Patent [19]

Treiman

[11] Patent Number: 4,466,078

[45] Date of Patent: Aug. 14, 1984

[54] AUTOMATED TIME RECORD PROCESSING SYSTEM

[76] Inventor: Alfred A. Treiman, 1519 Easterly Ter., Los Angeles, Calif. 90026

[21] Appl. No.: 174,237

[22] Filed: Jul. 31, 1980

[51] Int. Cl.[3] .............................................. G06F 15/20

[52] U.S. Cl. ..................................... 364/900; 235/377

[58] Field of Search ... 364/200 MS File, 900 MS File; 346/52, 59, 82; 235/377, 458

[56] References Cited

U.S. PATENT DOCUMENTS

| | | | |
|---|---|---|---|
| 3,775,752 | 11/1973 | Lorenzo | 364/200 |
| 4,011,434 | 3/1977 | Hockler | 235/377 |
| 4,044,331 | 8/1977 | Garofalo, Jr. et al. | 364/900 |
| 4,150,437 | 4/1979 | Russell et al. | 364/900 |
| 4,323,771 | 4/1982 | Chalker, Jr. et al. | 235/377 |

OTHER PUBLICATIONS

Encyclopedia of Computer Science, Ed. by A. Ralston and C. L. Meek, Van Nostrand Reinhold, 1976.

*Primary Examiner*—Thomas M. Heckler

[57] ABSTRACT

An apparatus for storing and processing card identification information and associated time information primarily intended for use in combination with a standard time clock. The apparatus includes a card reader removably mountable to a standard time clock and having a through opening overlying the time clock opening in registration therewith to permit passage of a time card through the aligned openings. The card reader contains means for detecting machine readable coded information contained on the card. Data processing means are located externally of the time clock and coupled to the card reader for processing coded information detected by the card reader. The data processing means includes means for: (1) converting the card identification information read by the card reader into storable data signals, (2) generating associated time signals representing insertion time of the card into the card reader, and (3) storing the card identification data signals and associated time signals in data storage means to permit processing and delayed demand readout thereof.

5 Claims, 2 Drawing Figures

AUTOMATED TIME RECORD PROCESSING SYSTEM

BACKGROUND OF THE INVENTION

The present invention relates to time record systems. More particularly, the invention relates to an automated system for maintaining employee time records to permit improved and more efficient payroll processing than has been available heretofore at reasonable cost.

Government regulations and union contracts require employers to maintain permanent employee attendance records from which employee payrolls are computed. The attendance record keeping and payroll determining process occurs either manually or through an automated system, sequentially in the following general steps:

(1) Each employee keeps a daily record (called raw time data) of arrival time, departure time and, depending on circumstances, lunch out and lunch return time. Usually this record is a time card, imprinted (generally electromechanically) by a time clock.

(2) At the end of each pay period, the completed employee time cards are collected, and the hours for which each employee is to be paid (i.e. payroll hours) is computed, usually by the payroll processing clerk(s), in accordance with established employer policy for rounding time (e.g., to the nearest quarter of an hour), tardiness penalty, and overtime determination.

(3) Computed totals of payroll hours for each employee, segregated between regular and overtime hours, are transcribed onto a listing for payroll preparation.

(4) Payroll checks based on payroll hours are prepared from a listing of the payroll in form appropriate for accounting entry into the employer's books and records. This last step is often done by computer, either in-house, or through a payroll service bureau, payroll hours generally being entered into the computer manually.

Since about the 1880's, the vast majority of businesses have kept employee raw time data by time cards and electromechanical time clocks. Such clocks have a slot into which an employee time card may be inserted. A permanent record of the time of insertion is then printed on the card by the printer located inside the time clock housing. The vast majority of time clocks in use today have no other capability than to keep time and to record time on a card inserted into the appropriate slot.

Recently, sophisticated microcomputer based time clocks have been developed to record and summarize the raw time employee data for subsequent direct input to a computerized payroll processing system. One such computerized payroll processing time clock is manufactured by Kronos Inc., of Boston, Mass. Other similar integrated raw time data processing clocks are described in U.S. Pat. No. 3,341,852 (Kramer et al), U.S. Pat. No. 3,740,759 (McKeegan et al), U.S. Pat. No. 3,894,215 (Lotter et al) and U.S. Pat. No. 4,170,015 (Elliano et al). All of such known computer based time clocks are shown as integrated units which are intended to replace an existing electromechanical time clock. Microcomputer based time clocks on the market today cost in the neighborhood of several thousand dollars and require the user to replace what is often an otherwise entirely suitable piece of equipment.

The cost of replacing existing electromechanical time clocks with the new computerized time clocks is prohibitive for the small or medium-sized employer, in particular. Therefore, for the majority of businesses, card imprinted time data is still being manually processed by tedious, time consuming, and costly clerical labor. Inherent in such manual processing is the possibility of human error being introduced at one or more of the manual processing steps.

SUMMARY OF THE INVENTION

The present invention is directed at providing a solution to the problem of reducing manual payroll processing costs and error without at the same time requiring large capital expenditures by a business to replace otherwise satisfactory equipment. The present invention therefore provides an automated time record processing system adapted to be used with existing electromechanical time clocks to provide desired raw or processed employee time record information which can then be fed directly into a payroll/paycheck preparing computer. In essence, this invention provides an independent system adaptable to existing electromechanical time clocks and dedicated solely to the recording of raw time data and processing same for direct computer input without affecting the existing time clock, the existing system of imprinting time in/out on time cards, and existing employee clocking procedures.

The system of this invention comprises a reading element housed in a suitable structure to be fixed directly over an existing time clock card slot such that, upon passing a card through the reader and into the time clock slot, a machine readable employee identification number recorded on the time card is read by the reader. The identification number and the card insertion time are transmitted to a processor device for storing the identification and time data in transmittable form for subsequent transmission to the payroll preparation computer. The processor/recorder is preferably contained in a housing associated with but not internally connected to the existing time clock. The processor is electrically connected only to the reader and may be physically located adjacent the existing time clock or at a more central location.

In a preferred embodiment, this invention comprises an employee time record processing system for use with standard electromechanical time clocks; the invention includes a card reader for reading card identification information contained on a time card in machine readable form; the card reader is adapted to be mounted over the existing time card slot in a standard electromechanical time clock so that an identified employee time card inserted into the time clock first passes through the card reader. Data processing means are located externally of the electromechanical time clock for (1) converting the card identification information read by the card reader into storable data signals, (2) generating time and/or time/day/date signals also in the form of storable data signals, and (3) storing the card identification data signals and associated time signals in data storage means, such as a RAM or a cassette tape, or the like, to permit long term (e.g., entire payroll period) storage of the data in a form directly usable by a payroll preparation computer. A cable connects the card reader electrically to the data processing means.

DESCRIPTION OF THE PREFERRED EMBODIMENT

Figure 1:
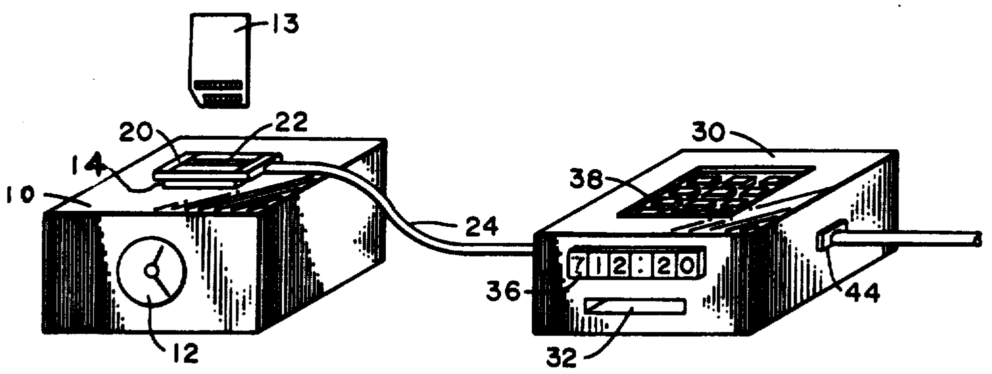
FIG. 1 shows the apparatus of this invention in combination with a standard electromechanical time clock.
Figure 2:
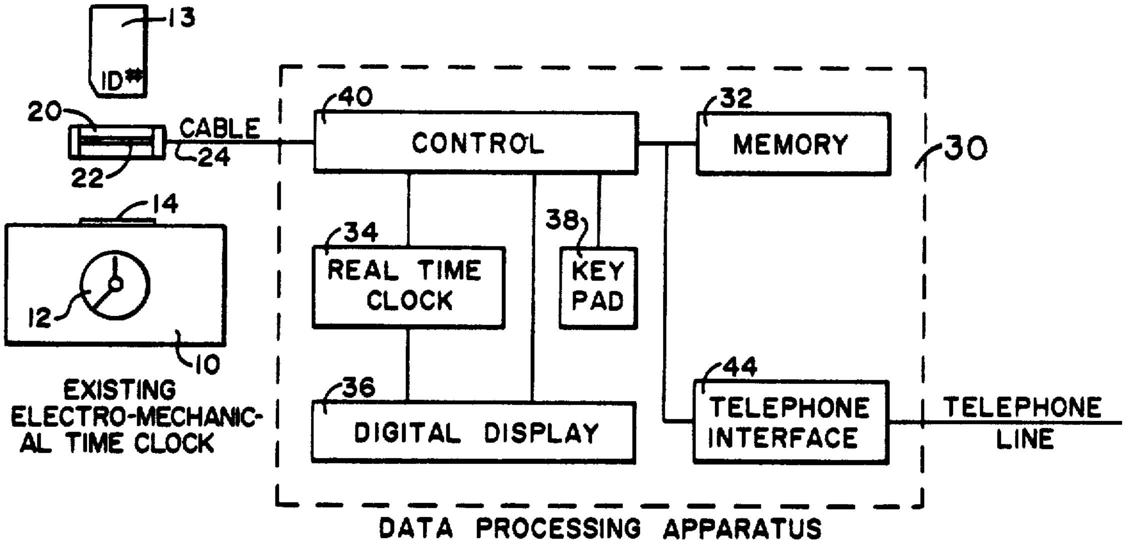
FIG. 2 shows a block diagram of the apparatus of this invention.

FIG. 1 shows an example of the time processing system of this invention in combination with a typical tandard electromechanical time clock currently in use in many businesses. The standard time clock 10 generally contains a clock face 12 conveniently located for easy viewing, and a slot 14 into which a typical time card 13 may be inserted in a known manner. The time clock is generally mounted on a wall at a convenient location in the business establishment to enable employees to readily "punch in" and "punch out" with maximum assurance that employees will remember, with a minimum of effort, to keep track of their time.

In accord with an embodiment of the invention as shown in FIG. 1, the existing time clock 10 need be modified only to the extent of affixing a card reader 20 to the time clock directly over the card receiving slot 14. Alternatively, the card reader 20 may be mounted above the time clock 10 directly over slot 14 but not in direct contact therewith. Card reader 20 can be supported over slot 14 by various means. Card reader 20 houses a multiplicity of reading elements; the reading elements advantageously and preferably read optically or magnetically coded information contained on a given time card 13. Alternatively, other known types of reading elements such as electrically conductive mechanical fingers, may also be used.

The card reader 20 contains a slot 22 substantially corresponding in size to slot 14. The reading elements housed in card reader 20 are located in one or both interior or side walls of reader 20 which, together with opposed shorter end walls, define the slot 22. Card reader 20 is mounted above or on the housing of time clock 10 such that slot 22 is located over and in register with slot 14 to permit free passage of an employee time card through slot 22 and into slot 14. The reader 20 may be secured to the wall to which the time clock is attached or to the time clock housing in any convenient manner, such as screws, with no disturbance to the time clock mechanism or function.

In a preferred embodiment, the card reader incorporates a 12 bit optical reader (e.g., Motorola 7820) with an appropriate light source. Light transmitting fibers may be located in the opposed side wall of slot 22 from that containing the light sensitive photocells of the reader. The light transmitting fibers may be brought together in a bundle at a light housing; thus a single lamp can be used to provide the light source for the twelve photo-devices of the optical reader.

The reader structure may contain a mechanism, such as a micro-switch, to sense the entry of a time card and in that event to cause the lighting of the reading lamp and enable the reading of the passing identification number on the inserted card. In an alternative embodiment, an LED/photocell unit pair is incorporated into the card reader 20 adjacent to the optical reader photocells and fiber optic sources. Preferably and advantageously, the LED is maintained in its emit condition. As long as the infrared photocell detects the infrared emissions from the LED, current flows through the photocell circuit which also includes the optical reader light source. When the optical path between the LED and its photocell is interrupted (by the passage of a time card through the slot 22), current flow through the photocell ceases and a signal is generated to light the optical reader lamp. The photo detectors, consisting of, for example, 12 photo diodes for detecting light emitted from the optical reader lamp, read the binary number punched into the time card as the time card is passed through the slot 22.

A spot detector or mark sensor circuit can be used in place of the hole detectors. The mark sensor detects differences in reflected light levels, in contrast to hole detection, i.e., transmitted light or no light passing through the card to a detecting cell. The mark sensor includes a light source, such as the single lamp and fiber optics bundle described above, and corresponding detectors for receiving and detecting light reflected from the surface of a time card passing through slot 22. A dark spot or mark printed on the card will reflect a substantially lesser amount of light than the normal background surface of the card.

As the card 13 passes through the slot 22, the spots are detected by the mark sensor and binary coded signals are produced. Mark sensing may be preferable to hole sensing primarily because of the lower cost involved in printing as compared to punching binary information onto the time cards. Other means of sensing and reading digital information are well-known and may prove desirable.

The card reader 20 is connected by an electrical cable 24 to a data processing apparatus, generally designated 30 in FIG. 1. The data processing apparatus 30 may be made sufficiently compact that it can be mounted next to or under or otherwise conveniently adjacent the time clock 10; alternatively, data processing apparatus 30 could be located at any other convenient location, limited only by the length of connecting cable 24 and the cost of installation.

The basic components of the data processing apparatus 30 include a memory device 32, a real time clock 34, a (preferably seven segment) digital display device 36, a manual data entry key pad 38, and a microprocessor control device 40. A power supply (not shown) provides power for each of the devices contained in the data processing apparatus 30, and the reader 20.

Clock 34 generates a digital time signal in a known manner. Such or similar clock circuits are found, for example, in digital watches and clocks so prevalent today. The digital display 36 is connected to the clock 34 to provide a visual indication of time generated by clock 34 and to permit synchronization of the standard time clock 10 with digital clock 34. This ensures an accurate hard copy record and correspondence of the time mechanically recorded on the employee time card with that stored in digital form in memory device 32.

Key pad 38 permits, among other things, setting of the clock 34 through control device 40 with simultaneous display on display 36. The key pad 38 also permits a manual entry on the tape (or other storage medium, of a unit record (e.g., an omitted employee clocking). Further, changes in employee status (e.g., pay rate, tax exemptions, department classification, etc.) could be entered on the tape for direct transmission to the payroll computer input. Controlled access to the key pad can be provided by any suitable means.

Each employee is assigned a number and a time card having that number printed and/or punched thereon along the leading edge thereof. It is contemplated that the time card is prepunched (by a standard 12-position keypunch) or mark sense printed across the time card leading edge, i.e., the edge first inserted through the card slot 22. The 12 binary positions, (including allowance for one parity bit) permit encoding of decimal numbers 1-4905; this capacity is believed to be entirely adequate for essentially all contemplated commercial purposes. Preferably, the number is binary encoded in two's complement form (dispensing with the parity bit) in adjacent parallel rows to ensure (by comparison circuitry) proper reading of the identification number and prevent false reading due to card and/or machine malfunction. In all other essential respects, the time card can be identical to those currently in use with standard electromechanical time clocks.

Insertion of a time card into slot 22 is detected by the sensing micro-switch mechanism or LED/photocell pair to begin a sequence of operations as follows:

The employee inserts his time card 13 into time clock 10 in the usual manner. The only difference is that, instead of inserting the card directly into the slot 14, it is inserted into the slot 22 in reader 20. However, as far as the employee is concerned, there is no significant difference in how he punches in or out.

The reader detects the identification number printed or punched on the time card. As noted above, the identification number is encoded either as an 11-bit binary number plus one parity bit or as a 12-bit binary number with its 2's complement. The identification number encoded on the time card is preferably read in parallel (i.e., all digits read concurrently). The detected parallel read number is stored in a termporary 12-bit storage register (I). At the same time, insertion of the card 13 into slot 22 signals control 40 to cause the internal real time digital clock 34 to store the time of entry in a temporary 12-bit storage register (II). The data stored on registers I and II comprise a 24-bit unit record of the time of an identified employee clocking.

In one embodiment, memory 32 comprises a cassette tape deck, requiring only a forward drive mechanism and a record head and associated circuitry. In a contemplated embodiment, audible digital signals are recorded in tape, such as a cassette, suitable for either delivery to a computer facility or for subsequent transmission over a standard telephone line directly to computer input, using presently available standard commercial equipment.

Withdrawal of the card 13 from slot 22 also causes control 40 to pass the data stored in registers I and II through a parallel-to-serial converter (e.g., a 4021 IC) and then through a voltage-to-frequency converter (e.g., a 9400 IC), to enable the identification number and time to be serially recorded as a dual tone binary signal on a cassette tape under the control of microprocessor control 40 and to signal the tape recorder or memory device 32 to start running (the tape recorder is always in record mode) to record identification and time information on the tape. Thus, the essential unit record stored on the tape consists of the card identification number and time of insertion, each comprising 12-bit segments of the 24-bit record. The tape storage unit is deactivated by control unit 40 upon completion of recording a unit record and storage registers I and II cleared.

The tape recording mechanism contained in data processing apparatus 30 need only contain enough components to start the tape drive, record onto the tape, and stop the tape drive; cost and space savings are effected by eliminating extraneous controls such as erase, playback and rewind mechanisms.

After a designated time, such as the end of each pay period, the recorded cassette is removed and replaced with a fresh cassette.

Memory device 32 might be advantageously comprised of mini-disc and drive. In either case, the recorded cassette or mini-disc, either in place or removed, is available for automated computer entry, thus eliminating manual data entry into the computer.

In addition to the essential features of the system of this invention as described above, the data processing apparatus 30 can incorporate additional features such as enabling periodic data transmission directly to a computer input on computer command. In still further modification, the cassette tape or mini-disc device can be replaced by a RAM or bubble memory storage unit in combination with the telephone interface 44.

Although not shown, an arithmetic logic unit (ALU) could also be included to enable summarization of the raw time data to provide net accumulated attendance time, either daily or for the entire pay period. A suitable ALU would include internal programming (e.g., programmable ROM) for the rounding of time, etc., on an entry by entry basis in accordance, for example, with employer pay policy. Or data could be maintained for reporting by exception (as that term is well-understood in payroll processing art).

Essentially all of the individual component parts of this invention are availble as off the shelf items. The present invention combines these component parts into a new arrangement which utilizes existing equipment to upgrade the recording of employee time data in machine readable and transmittable form, thus eliminating or minimizing the element of human error in processing such employee time information for payroll determination purposes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In combination with a standard electromechanical time clock having an opening therein for receiving a machine readable time card comprising coded identification information, an apparatus for recording the card identification information and associated time information, comprising:

card reader means for reading said machine readable card indentification information contained on said card inserted through the card reader means into the time clock, said card reader means being removably mounted over said standard time clock opening in registration therewith;

data processing means located externally of said standard time clock for:

(1) converting the card identification information read by the said card reader means into storable data signals, (2) generating associated time signals representing insertion time of said card into said card reader, and (3) storing said card identification data signals and associated time signals in a data storage means to permit delayed demand readout thereof; and means electrically coupling said card reader means to said data processing means.

2. For use in combination with a standard time clock having an opening therein for receiving a machine readable time card comprising coded identification information to be imprinted with the time of insertion in the usual manner of the standard time clock, an apparatus for storing said card identification information and associated time information, comprising:

card reader means having a through opening therein to permit passage therethrough of said time card, said card reader means being removably mountable to said standard time clock such that said card reader means through opening overlies said time clock opening in registration therewith, said card reader means containing means for detecting the machine readable coded information contained on said card; and data processing means located externally of said standard time clock and coupled to said card reader means for processing said coded information detected by said card reader means, said data processing means including:

(1) real time digital clock means, (2) digital information storage means, (3) means for transmitting said detected coded information to said storage means in a digital stream, and (4) means for transmitting real time digital data to said storage means in conjunction with said detected coded information;

said processing means and said card reader means being independent of and not connected to the operating mechanism of said standard time clock.

3. For use in combination with a standard time clock having an opening therein for receiving a machine readable time card comprising coded identification information to be imprinted with the time of insertion in the usual manner of the standard time clock, an apparatus for storing said card identification information and time information, comprising:

card reader means having a through opening therein to permit passage therethrough of said time card, said card reader means being removably mountable to said standard time clock such that said card reader means through opening overlies said time clock opening in registration therewith, said card reader means containing means for detecting the machine readable coded information contained on said card;

data processing means located externally of said standard time clock for:

(1) converting the card identification information read by said card reader means into storable data signals, (2) generating associated time signals representing insertion time of said card into said card reader, and (3) storing said card identification data signals and associated time signals in a data storage means to permit delayed demand readout thereof; and means electrically coupling said card reader means to said data processing means;

said data processing means and said card reader means being independent of and not connected to the operating mechanism of said standard time clock.

4. Apparatus according to claim 1, 2, or 3, wherein said card reader means comprises an electro-optical reader for detecting optically readable coded information contained in said time card.

5. Apparatus according to claim 1, 2, or 3, wherein said card reader means comprises an electromagnetic reader for detecting magnetically coded information stored on said time card.

* * * * *